United States Patent [19]
Crumb et al.

[11] Patent Number: 5,946,914
[45] Date of Patent: Sep. 7, 1999

[54] MASTER CYLINDER RESERVOIR RETENTION MEANS

[75] Inventors: Donald A. Crumb, Granger, Ind.;
Thad A. Nevitt, Cedar Falls, Iowa

[73] Assignee: Bosch Systemes de Freinage, Drancy, France

[21] Appl. No.: 09/182,622

[22] Filed: Oct. 29, 1998

[51] Int. Cl.$^6$ .............................. F15B 7/00; B60T 11/26
[52] U.S. Cl. ............................................. 60/583; 60/585
[58] Field of Search .............................. 60/583, 585, 586, 60/587

[56] References Cited

U.S. PATENT DOCUMENTS

| | | | |
|---|---|---|---|
| 4,702,078 | 10/1987 | Briggs et al. | 60/585 |
| 5,647,212 | 7/1997 | Coleman | 60/585 X |

FOREIGN PATENT DOCUMENTS

| | | | |
|---|---|---|---|
| 4115063 | 11/1992 | Germany | 60/585 |
| 2069646 | 8/1981 | United Kingdom | 60/585 |

*Primary Examiner*—Hoang Nguyen
*Attorney, Agent, or Firm*—Leo H. McCormick, Jr.; Warren Comstock

[57] ABSTRACT

A master cylinder having a first housing with an axial bore therein which is connected to a second housing of a reservoir. The axial bore has a first replenishing port surrounded by a first boss and a second replenishing port surrounded by a second boss. A first radial bore in the first boss extends from the first replenishing port while a second radial bore in the second boss extends from the second replenishing port. First and second spigots which extends from the second housing are respectively located in the first and second radial bores to provide first and second flow communication paths from the reservoir to the axial bore. The first housing is secured to the second housing by a connecting arrangement characterized by a first pin that extends through the first boss and first spigot and a second pin that extends through the second boss and the second spigot to respectively retain first and second seals within the first and second radial bores without the introduction of side load forces which may provide a leak path between either the first or second flow communication paths and the surrounding environment.

7 Claims, 1 Drawing Sheet

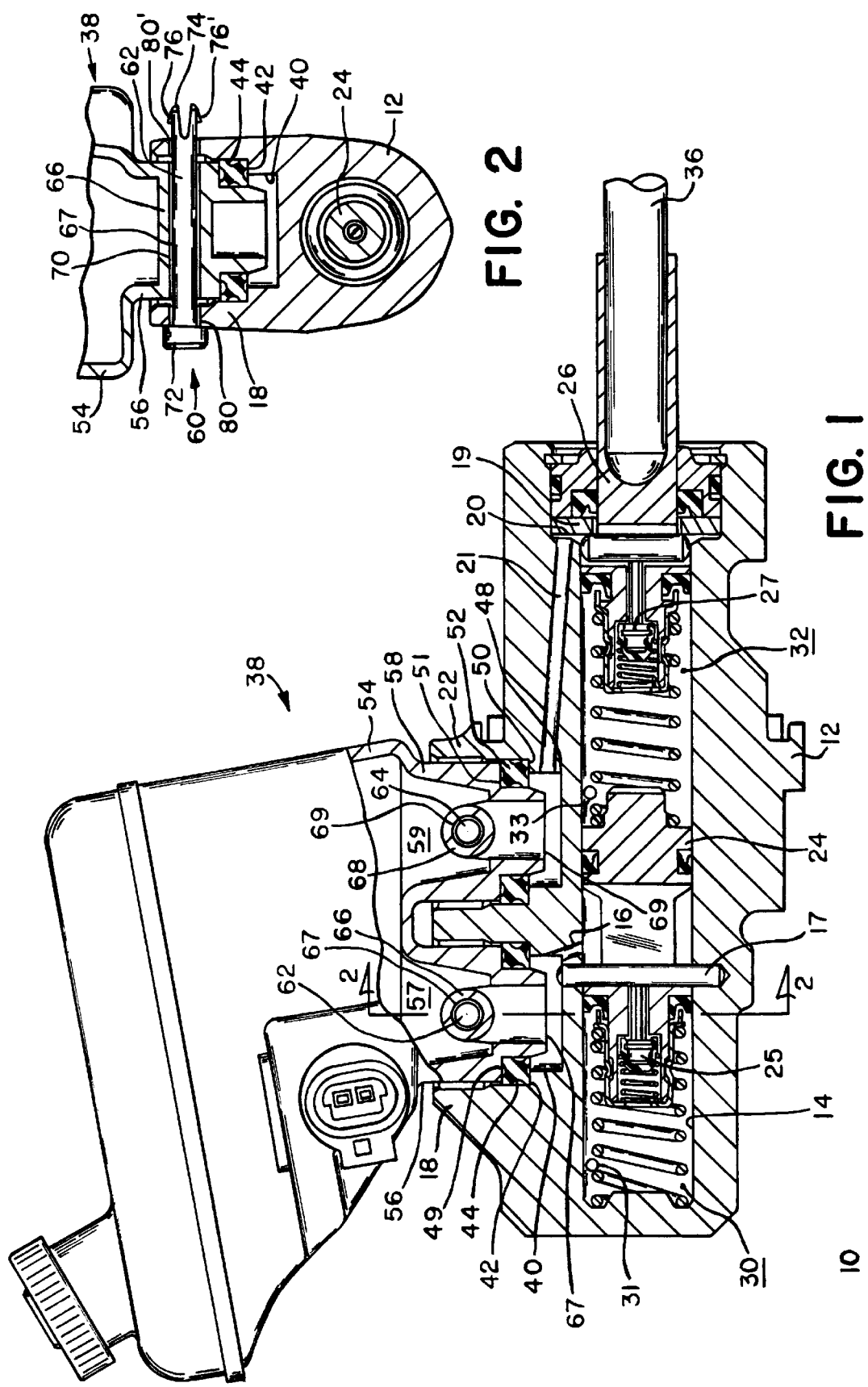

MASTER CYLINDER RESERVOIR RETENTION MEANS

This invention relates to a retention arrangement for securing a reservoir to a master cylinder.

BACKGROUND OF THE INVENTION

It was common for master cylinders to be manufactured by being cast or molded from a common metal such as cast iron and thereafter an axial bore and associated compensation ports brought into a desired specification by a machining operation. In order to reduce the weight of a master cylinder the cast iron was replaced with aluminum and still later only the body made of aluminum while the reservoir was made of a plastic material. U.S. Pat. Nos. 4,514,983 and 5,743,092 disclose an attachment arrangement for securing such a plastic reservoir to a metal housing through the use of engaging tabs whereas U.S. Pat. Nos. 5,647,212 and 5,743,093 disclose a more positive attachment through a projection on the reservoir which is bolted to the housing of the master cylinder. These attachment arrangements perform in a satisfactory manner. Unfortunately, considerable material is required for the projections and they are often located in a position where damage may occur or manufacturing tolerances may introduce side loading forces on seals associated with the connection such that a leak path may occur.

SUMMARY OF THE INVENTION

In evaluating attachments arrangements it was deemed desirable to substantially reduce side loads on the seals associated with the connection, to reduce the amount of material needed to make the connection and to protect such components from damage by external forces.

According to the present invention, a master cylinder has a first housing with an axial bore therein which is connected to a second housing of a reservoir. The axial bore has a first replenishing port which is surrounded by a first boss and a second replenishing port which surrounded by a second boss. A first radial bore in the first boss extends from the first replenishing port while a second radial bore in the second boss extends from the second replenishing port. First and second spigots which extend from the second housing are respectively located in the first and second radial bores to provide first and second flow communication paths from the reservoir to the axial bore. The first housing is secured to the second housing by a connecting arrangement characterized by a first pin that extends through the first boss and an integral sleeve in the first spigot and a second pin that extends through the second boss and an integral sleeve in the second spigot to respectively retain first and second seals within the first and second radial bores without the introduction of side load forces which may provide a leak path between either the first or second flow communication paths and the surrounding environment.

An advantage of the present invention resides in an integrally formed sleeves which define bearing surfaces for pins to secure first and second spigots of a reservoir housing in bosses located on the housing of a master cylinder.

A further advantage of this invention is to provide a master cylinder with first and second spigots which are located in corresponding first and second bosses of a housing such that forces imposed to separate the spigots from the bosses are uniformly distributed to perpendicular retention members to substantially reduce side forces on corresponding seals and reduce a potential leak path to the surrounding environment.

BRIEF DESCRIPTION OF THE DRAWINGS

FIG. 1 is a schematic illustration of a master cylinder with a reservoir connection made according to the present invention; and FIG. 2 is a sectional view taken along line 2—2 of FIG. 1 illustrating a connecting pin of the present invention.

DETAILED DESCRIPTION

The master cylinder 10 shown in FIG. 1 has a housing 12 with an axial bore 14 located therein. A first compensation port 16 in housing 12 connects a first boss 18 with axial bore 14 and a second compensation port 20 connects a second boss 22 with axial bore 14. First 24 and second pistons 26 of a type disclosed in U.S. Pat. No. 5,279,125 are located in axial bore 14 to define first 30 and second 32 pressure chambers within housing 12. Chamber 30 is connected through port 31 to a first set of wheel brakes of a vehicle and chamber 32 is connected through port 33 to a second set of wheel brakes of the vehicle. A push rod 36 is connected to piston 26 and receives an input from an operator to effect a brake application. Axial bore 14 is connected to reservoir 38 through flow paths through bosses 18 and 22 to receive fluid and thereby maintain the fluid level in the brake system at a desired level for adequate operation. The connections are designed to reduce the introduction of side loads that may cause an unbalance on seals and thereby permit a leak path which could allow fluid to be communicated the surrounding environment.

In more particular detail, the axial bore 14 has a first compensation or replenishing port 16 which is surrounded by the first boss 18 and a second replenishing port 20 which is connected to the second boss 22 by passage 21. For this application, the first 18 and second 22 bosses having a common point of radial tangency to minimize the space requirement for the operational length of the axial bore 14 of housing 12 but could be separated but when housing 12 is not inserted into a power assist booster. The first boss 18 has a first radial bore 40 which is connected to the axial bore 14 through replenishing port 16. Radial bore 40 is relative uniform in diameter but does possess a single operational step 42 adjacent replenishing port 16 to define a limit for retaining a square seal 44. A pin 17 is inserted into housing 12 through an opening in the radial bore 40 to define a stop for piston 24 in axial bore 14. The second boss 22 has a second radial bore 48 that is connected to passage 21 of the second replenishing port 20. Radial bore 48 is relative uniform in diameter but does possess a single operational step 50 adjacent passage 21 for replenishing port 20 to define a limit for retaining a square seal 52.

Reservoir 38 has a second housing 54 with first 56 and second spigots 58 extending therefrom. The first spigot 56 is designed to be located in the first radial bore 40 to provide a first flow communication path from a first chamber 57 in reservoir 38 to axial bore 14. The second spigot 58 is designed to be located in the second radial bore 48 to provide a second flow communication path from a second chamber 59 in reservoir 38 to axial bore 14. The first spigot 56 has a shoulder 49 which cooperates with step 42 to retain seal 44 in radial bore 40 similarly the second spigot 58 has a shoulder 51 which cooperates with step 50 to retain seal 52 in radial bore 48.

The connection arrangement 60 for securing the reservoir 38 to housing 12 is best shown in FIG. 2 with respect to boss 18 but the same components and description are applicable for boss 22.

The connecting 60 includes a first pin 62 that extends through the first boss 18 and the first spigot 56 and a second pin 64 that extends through the second boss 22 and second spigot 58. Spigot 56 has a first cylindrical sleeve 66 that is integral with housing 54 that defines a first bearing surface which is perpendicular to the cylindrical projection forming spigot 56 while the second spigot 58 has a second cylindrical sleeve 68 which is integral with housing 54 that defines a second bearing surface which is perpendicular to the cylindrical projection forming spigot 58. Cylindrical sleeves 66 and 68 are positioned a sufficient distance from openings 67 and 69 so as not to interfere with the communication from chambers 57 and 59 to axial bore 14 in housing 12.

The first 62 and 64 pins are identical and each have a cylindrical body 70 with a head 72 on a first end and tines 74 on a second end. The tines 74 having barbs 76,76' that are designed to engage housing 12 and prevent the pins 62 and 64 from easily being removed from sleeves 66 and 68.

METHOD OF ASSEMBLY

A preferred method of attaching the housing 54 of the reservoir 38 to the housing 12 of a master cylinder 10 comprising the steps of:

placing a first seal 44 against step 42 of radial bore 40 in boss 18 that extends from housing 12;

placing a second seal 52 against step 50 of radial bore 48 in boss 22 that extends from housing 12;

moving the cylindrical projection of spigot 56 that extends from housing 54 of reservoir 38 into radial bore 40;

moving the cylindrical projection of spigot 58 that extends from housing 54 of reservoir 38 into radial bore 48;

applying a force to housing 54 of reservoir 38 and housing 12 of master cylinder 10 to respectively align a first horizontal opening 80 in boss 18 with a corresponding horizontal opening 67 in sleeve 66 in the cylindrical spigot 56 and a second horizontal opening 82 in boss 22 with a corresponding horizontal opening 69 in sleeve 68;

inserting pin 62 into horizontal opening 80 in boss 18 after tines 74 have been compressed and thereafter moving pin 62 in horizontal opening 67 until head 72 engages housing 12 at which time tines 74 have moved through opening 80' such that barbs 76,76 are outside of housing 12;

inserting pin 64 into horizontal opening 80 in boss 22 after tines 74 have been compressed and thereafter moving pin 64 in horizontal opening 69 until head 72 engages housing 12 at which time tines 74 have moved through opening 80' such that barbs 76,76' are outside of housing 12, the tines 74 on pins 62 and 64 after expanding position the barbs 76,76' to respectively retain the spigots 56 and 58 in bosses 18 and 22 such that the first 44 and second 52 seals are positioned within radial bores 40 and 50 without the introduction of side load forces which may provide a leak path between either a first or second flow communication paths between chambers 57 and 59 and the surrounding environment.

MODE OF OPERATION OF THE INVENTION

When an operator desires to effect a brake application, a force is applied to push rod 36 which moves the first and second pistons 24 and 26 away from stop pins 17 and 19 allowing compensation valves 25 and 27 to close and thereafter pressurize fluid in chambers 30 and 32. The pressurized fluid is supplied through to the brake system through outlet ports 31 and 33 to effect a brake application. On termination of the input force to push rod 36, return springs move the pistons 24 and 26 into engagement with stop pins 17 and 19 to reestablish flow communication between chambers 57 and 59 and replenish any fluid lost from the system to maintain optimum braking capability.

Should the fluid in bore 40 or bore 50 be pressurized, any force directly acts in an axial plane on seals 44 and 52 and is transmitted into spigots 56 and 58. With the sleeves 66 and 68 positioned in a plane perpendicular to bores 40 and 50 side forces on seals 44 and 52 are essentially eliminated and as a result a leak path to the surrounding environment is avoided.

We claim:

1. A method of attaching a reservoir to a housing of a master cylinder comprising the steps of:

placing a first seal in a first cylindrical opening in a first boss that extends from said housing;

placing a second seal in a second cylindrical opening of a second boss that extends from said housing;

moving a first cylindrical projection extending from said reservoir into said first cylindrical opening;

moving a second cylindrical projection extending from said reservoir into said second cylindrical opening;

applying a force to said reservoir and housing to respectively position said first and second seals within said first and second cylindrical openings while respectively aligning a first horizontal opening in said first boss with a corresponding first horizontal opening in said first cylindrical projection and a second horizontal opening in said second boss with a corresponding second horizontal opening in said second cylindrical projection; and inserting a first pin into said first horizontal openings in said first boss and said first cylindrical projection and a second pin into said second horizontal openings in said second boss and said second cylindrical projection to secure said to reservoir to said housing and seal said first and second flow paths from the surrounding environment.

2. The master cylinder as produced by the method as recited in claim 1.

3. A master cylinder having a first housing with an axial bore therein, said axial bore having a first replenishing port surrounded by a first boss and a second replenishing port surrounded by a second boss, said first boss having a first radial bore that extends from said first replenishing port, said second boss having a second radial bore that extends from said second replenishing port, a reservoir having a second housing with first and second spigots extending therefrom, said first spigot being located in said first radial bore to provide a first flow communication path from said reservoir to said axial bore, said second spigot being located in said second radial bore to provide a second flow communication path from said reservoir to said axial bore, and connecting means for securing said second housing to said first housing, said connecting means being characterized by a first pin that extends through said first boss and said first spigot and a second pin that extends through said second boss and said second spigot to respectively retain first and second seals within said first and second radial bores without the introduction of side load forces which may provide a leak path between either said first or second flow communication paths and the surrounding environment.

4. The master cylinder as recited in claim 3 further characterized by said first and second pins each having a cylindrical body with a head on a first end and tines on a second end, said tines on said first pin being compressed on insertion into said first boss and first spigot and expanding as said head approaches said first boss to engage said first boss and fix said first pin in said first boss, said tines on said second pin being compressed on insertion into said second boss and second spigot and expanding as said head approaches said second boss to engage said second boss and fix said second pin in said second boss.

5. The master cylinder as recited in claim 4 further characterized by said tines having a barb which assists in respectively retaining said first and second pins within said first and second bosses.

6. The master cylinder as recited in claim 5 further characterized by said second housing having first and second cylindrical sleeves which are respectively located in said first and second spigots, said first and second sleeves being integral with said second housing and respectively forming bearing surfaces for said first and second pins.

7. The master cylinder as recited in claim 6 further characterized by said first and second bosses having a common point of radial tangency to minimize the space requirement for the operational length of the axial bore of the first housing.

* * * * *